United States Patent
Agrawal et al.

(10) Patent No.: US 9,524,631 B1
(45) Date of Patent: Dec. 20, 2016

(54) METHOD AND APPARATUS FOR SETTING A NOTIFICATION READOUT MODE BASED ON PROXIMITY DETECTION

(71) Applicant: Motorola Mobility LLC, Chicago, IL (US)

(72) Inventors: Amit Kumar Agrawal, Bangalore (IN); Rachid M Alameh, Crystal Lake, IL (US); John O'Leary, River Forest, IL (US); Satyabrata Rout, Karnataka (IN); Andre Luiz Silva Bazante, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/746,979

(22) Filed: Jun. 23, 2015

(51) Int. Cl.
    *G08B 21/00* (2006.01)
    *G08B 21/18* (2006.01)
    *H04M 1/60* (2006.01)
    *H04M 1/247* (2006.01)

(52) U.S. Cl.
    CPC ............ *G08B 21/18* (2013.01); *H04M 1/2474* (2013.01); *H04M 1/6041* (2013.01)

(58) Field of Classification Search
    CPC .... G08B 21/18; H04M 1/6041; H04M 1/2474
    See application file for complete search history.

(56) References Cited

U.S. PATENT DOCUMENTS

| | | | |
|---|---|---|---|
| 7,905,832 B1* | 3/2011 | Lau | G06F 11/3013 128/920 |
| 2010/0073169 A1* | 3/2010 | Needham | A61J 7/0481 340/573.1 |
| 2010/0122283 A1* | 5/2010 | Button | G06Q 30/0601 725/32 |
| 2010/0189231 A1* | 7/2010 | LaFreniere | H04M 1/2535 379/93.01 |
| 2012/0191454 A1* | 7/2012 | Gabara | G10L 17/00 704/246 |
| 2013/0211870 A1* | 8/2013 | Lawson | G06Q 10/06315 705/7.25 |
| 2013/0335612 A1* | 12/2013 | Roman | G06Q 10/08 348/333.01 |
| 2014/0047107 A1* | 2/2014 | Maturana | H04L 43/04 709/224 |
| 2014/0094297 A1* | 4/2014 | Adachi | G07F 17/3234 463/29 |
| 2014/0122079 A1* | 5/2014 | Kaszczuk | G10L 13/02 704/260 |
| 2014/0129487 A1* | 5/2014 | Adachi | G07F 17/3206 706/11 |
| 2014/0192197 A1* | 7/2014 | Hanko | H04L 12/2829 348/156 |

(Continued)

*Primary Examiner* — Erin File

(57) ABSTRACT

A method 400 and apparatus for setting a notification readout mode based on proximity detection includes an electronic computing device configured to determine 402 that a notification readout function is enabled on the electronic computing device. The electronic computing device is further configured to determine 404 a proximity status for the electronic computing device using at least one sensor of the electronic computing device and to set 410, based on the determined proximity status, a notification readout mode for the electronic computing device.

21 Claims, 9 Drawing Sheets

(56) References Cited

U.S. PATENT DOCUMENTS

| | | | | |
|---|---|---|---|---|
| 2014/0266939 A1* | 9/2014 | Baringer | ............... | H01Q 21/28 |
| | | | | 343/729 |
| 2014/0270097 A1* | 9/2014 | Ashizuka | ............ | H04M 1/0202 |
| | | | | 379/44 |
| 2014/0306814 A1* | 10/2014 | Ricci | .................... | H04W 48/04 |
| | | | | 340/425.5 |
| 2015/0030212 A1* | 1/2015 | Cavanagh | .......... | G06K 9/00885 |
| | | | | 382/115 |
| 2015/0164409 A1* | 6/2015 | Benson | ................. | A47C 31/00 |
| | | | | 600/301 |
| 2015/0213702 A1* | 7/2015 | Kimmel | ............... | G08B 21/043 |
| | | | | 382/103 |
| 2015/0220935 A1* | 8/2015 | Iwai | ........................ | G07G 1/01 |
| | | | | 705/304 |
| 2015/0356973 A1* | 12/2015 | Wansley | ............... | G10L 17/005 |
| | | | | 704/246 |
| 2015/0373404 A1* | 12/2015 | Fukazawa | .......... | G06K 9/00288 |
| | | | | 725/53 |
| 2016/0015315 A1* | 1/2016 | Auphan | ............... | A61B 5/4815 |
| | | | | 600/301 |
| 2016/0054023 A1* | 2/2016 | Baker | .................... | E04F 19/00 |
| | | | | 307/31 |

\* cited by examiner

METHOD AND APPARATUS FOR SETTING A NOTIFICATION READOUT MODE BASED ON PROXIMITY DETECTION

FIELD OF THE DISCLOSURE

The present disclosure relates generally to proximity detection and more particularly to an electronic computing device reading out notifications based on a number of individuals detected in proximity to the electronic computing device.

BACKGROUND

As electronic computing devices decrease in form factor while simultaneously growing in processing power, tactile means of operation are being increasingly abandoned in favor of voice operation. A small touchscreen can be difficult to tap without a stylus and difficult to read without glasses. Voice input and output addresses these difficulties and also frees a user's hands for other tasks, but it introduces problems of its own. When an electronic computing device vocalizes messages, for example, the messages can be overheard by individuals for whom the messages are not intended. This is especially a concern if the messages are of a confidential nature. Further, it is more challenging for a blind or visually impaired person to determine when he or she is alone for purposes of having his or her messages read out loud.

BRIEF DESCRIPTION OF THE FIGURES

The accompanying figures, where like reference numbers refer to identical or functionally similar elements throughout the separate views, form part of the specification and illustrate embodiments in accordance with the included claims.

Figure 1:
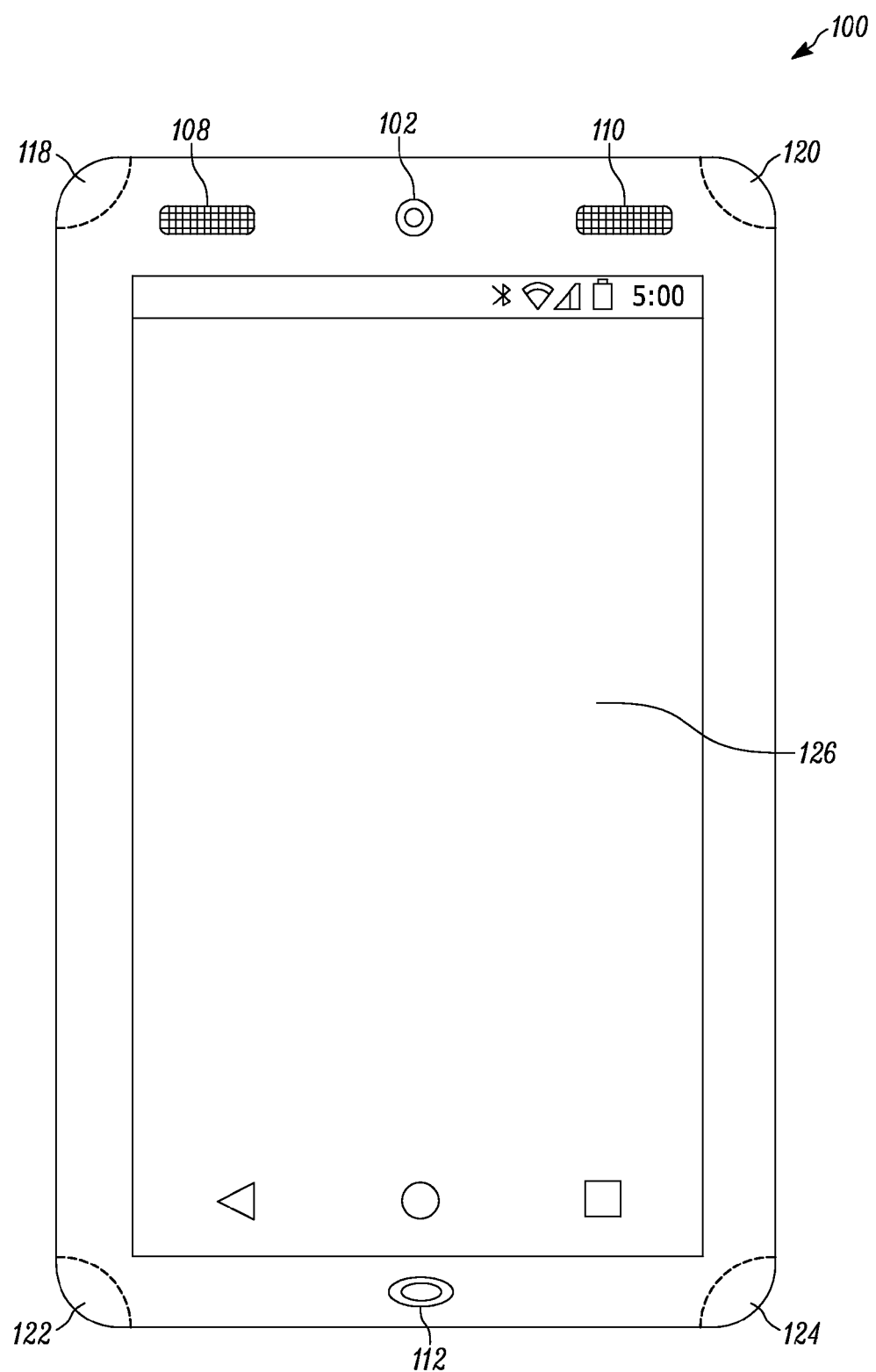
FIG. 1 shows an electronic computing device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for setting a notification readout mode based on proximity detection. More specifically, an electronic computing device reads out pending notifications differently depending upon a number of individuals the electronic computing device detects in its proximity. While a notification readout function is enabled on the electronic computing device, the electronic computing device can immediately read out pending notifications, first prompt for authorization to read out the pending notifications, or wait for more favorable circumstances to read out the pending notifications.

In accordance with the teachings herein, a method performed by an electronic computing device for setting a notification readout mode based on proximity detection includes determining that a notification readout function is enabled on the electronic computing device. The method further includes determining a proximity status for the electronic computing device using at least one sensor of the electronic computing device and setting, based on the determined proximity status, a notification readout mode for the electronic computing device.

Also in accordance with the teachings herein is an electronic computing device, configured to set a notification readout mode based on proximity detection, that includes at least one sensor configured to detect individuals in proximity to the electronic computing device. The electronic computing device additionally includes a processing element operatively coupled to the at least one sensor, wherein the processing element is configured to determine a proximity status of no individuals, one individual, or multiple individuals detected in proximity to the electronic computing device and set, based on the determined proximity status, the notification readout mode for the electronic computing device.

For one embodiment, the at least one sensor includes at least one of a thermal sensor or an infrared sensor. For another embodiment, the electronic computing device further includes a microphone configured to receive a voice of an individual in proximity to the electronic computing device and a voice processing module, operatively coupled to the microphone and the processing element, configured to perform voice analysis upon the voice. The processing element is further configured to authenticate, based on the voice analysis, that an individual in proximity to the electronic computing device is an owner of the electronic computing device and set the notification readout mode to DIRECT when the processing element determines a proximity status of one individual or set the notification readout mode to VERIFY when the processing element determines a proximity status of multiple individuals.

An electronic computing device, also referred to simply as an electronic device, is any device configured to read out notifications verbally so that the notifications can be heard by a user or an owner of the electronic device. A non-exhaustive list of electronic computing devices consistent with described embodiments includes smartphones, smartwatches, phablets, tablets, personal media players, personal digital assistants, enterprise digital assistants, television interfacing devices, such as media streaming devices, laptops, personal computers, and workstations.

A notification, as used herein, is any message or communication that is received or generated by an electronic computing device and that is intended for a user or an owner of the electronic device. Notifications include e-mails, text messages, and voice messages. A pending notification is a notification that is marked as unread or unheard by its intended recipient. When an electronic device receives an e-mail, for example, the e-mail is a pending notification until the electronic device receives an indication that the email has been opened by or read to an owner of the electronic device, who is the intended recipient of the e-mail. It might also be the case that after reading or hearing the e-mail, the owner marks the e-mail as unread to continue the pending status of the e-mail.

FIG. 1 shows an electronic computing device, specifically a smartphone 100, which is referred to in describing included embodiments. The smartphone 100 is shown with a number of components, namely a microphone 102, left 108 and right 110 stereo speakers, an infrared sensor 112, four thermal sensors 118, 120, 122, 124 located at corners of the smartphone 100, and a touchscreen 126. These components 102, 108, 110, 112, 118, 120, 122, 124, 126 enable the smartphone 100 to perform in accordance with described embodiments. In other embodiments, different electronic computing devices having similar components are used to perform functionality described herein with respect to the smartphone 100. These electronic computing devices and their included components are represented by and described with reference to FIG. 2.

Figure 2:
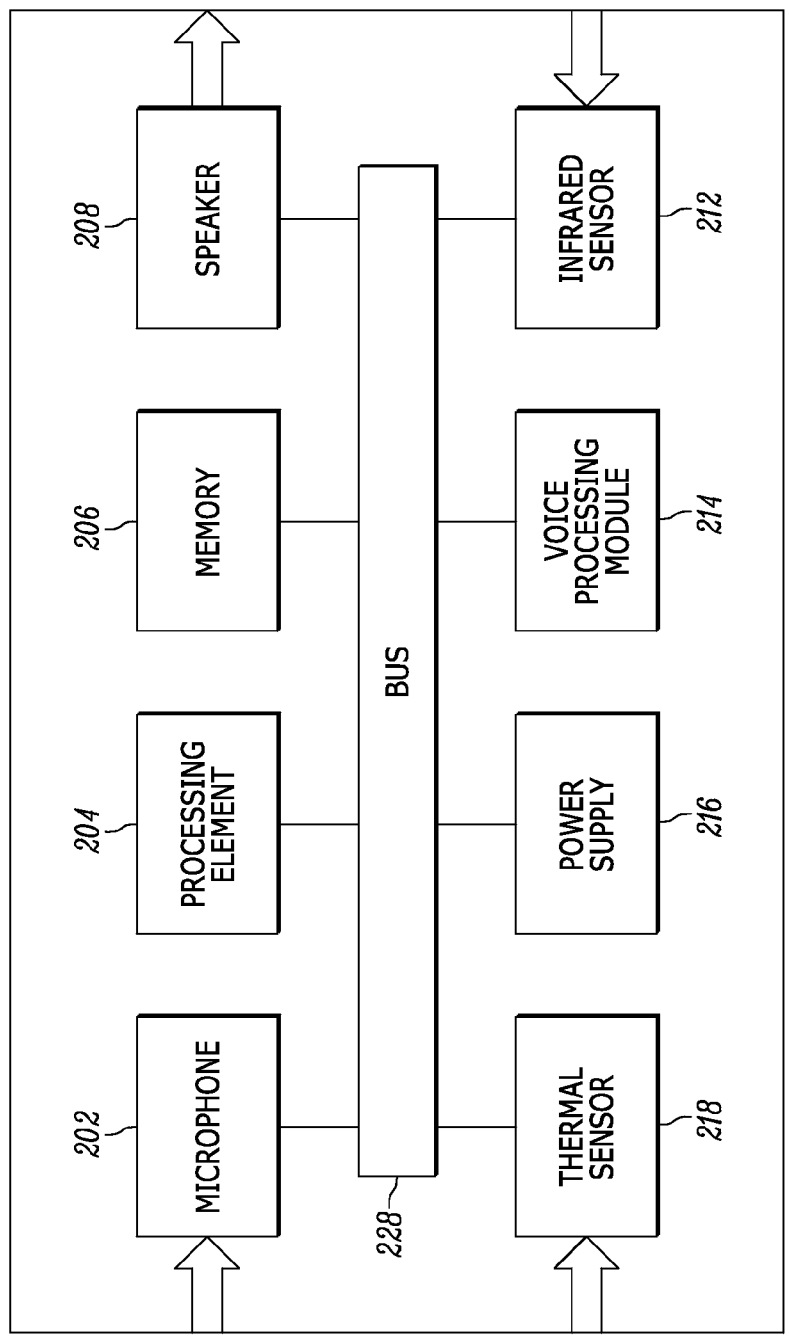
FIG. 2 shows a block diagram of an electronic computing device, in accordance with some embodiments.

FIG. 2 shows a block diagram of a nonspecific electronic computing device 200 in accordance with embodiments of the present teachings. For a particular embodiment, the electronic computing device 200 represents the smartphone 100. Included within the electronic computing device 200 is a processing element 204, memory 206, a speaker 208, a microphone 202, a voice processing module (VPM) 214, an infrared sensor 212, a thermal sensor 218, and a power supply 216, which are all operationally interconnected by a bus 228. A limited number of device components 202, 204, 206, 208, 212, 214, 216, 218, 228 are shown within the electronic computing device 200 for ease of illustration. Other embodiments may include a lesser or greater number of components in an electronic computing device. Moreover, other components needed for a commercial embodiment of an electronic computing device that incorporates the components 202, 204, 206, 208, 212, 214, 216, 218, 228 shown for the electronic computing device 200 are omitted from FIG. 2 for clarity in describing the enclosed embodiments.

In general, the processing element 204 is configured with functionality in accordance with embodiments of the present disclosure as described herein with respect to the remaining figures. "Configured," "adapted," "operative," or "capable," as used herein, means that indicated components are implemented using one or more hardware elements, such as one or more operatively coupled processing cores, memory elements, and interfaces, which may or may not be programmed with software and/or firmware, as the means for the indicated components to implement their desired functionality. Such functionality is supported by the other hardware shown in FIG. 2, including the device components 202, 204, 206, 208, 212, 214, 216, and 218, which are all operatively interconnected with the processing element 204 by the bus 228.

The processing element 204, for instance, includes arithmetic logic and control circuitry necessary to perform the digital processing, in whole or in part, for the electronic computing device 200 to set a notification readout mode based on proximity detection in accordance with described embodiments for the present teachings. For one embodiment, the processing element 204 represents a primary microprocessor, also referred to as a central processing unit (CPU), of the electronic computing device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components of the electronic computing device 200 to perform at least some of their intended functionality. For one embodiment, the ancillary processor is a graphical processing unit (GPU) for an electronic device having a display screen.

The memory 206 provides storage of electronic data used by the processing element 204 in performing its functionality. For example, the processing element 204 can use the memory 206 to load programs and/or store files associated with setting a notification readout mode based on proximity detection. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with setting a notification readout mode based on proximity detection.

The speaker 208, or any transducer that converts electrical, mechanical, or electromagnetic energy into acoustic energy, gives the electronic computing device 200 the means to generate speech. By generating speech, the electronic device can vocally read out notifications. For some embodiments, the speaker 208 is a built-in component of the electronic computing device 200. The smartphone 100, for example, includes integrated speakers 108, 110. In other embodiments, the electronic computing device 200 does not have a built-in speaker but instead includes an interface that allows the electronic computing device 200 to connect with one or more speakers. For example, a personal electronic device might include a headphone jack that allows headphones to be plugged into and used by the electronic device.

The microphone 202, or any transducer that converts acoustic energy into electrical, mechanical, or electromagnetic energy, gives the electronic computing device 200 the means to receive speech. In different embodiments, the electronic computing device 200 can use received speech to detect the presence of an individual, authenticate an individual, and/or as authorization to read out notifications.

The VPM 214 includes hardware and software elements needed to process voice data received as speech by the microphone 202 or an acoustic transducer. Processing voice data can include recognizing words. Preprogrammed words, for example, can be used to authenticate an individual. Other words might authorize the electronic computing device 200 to read out a notification or instruct it to delay reading out the notification. The VPM 214 can include a single or multiple voice recognition engines of varying types, each of which is best suited for a particular set of conditions, such as for specific characteristics of a voice or noise conditions. The VPM 214 might also include a voice activity detector (VAD), which allows the electronic computing device 200 to discriminate between those portions of a received acoustic signal that include speech and those portions that do not. In voice recognition, the VAD is also used to facilitate speech processing, obtain isolated noise samples, and to suppress non-speech portions of acoustic signals.

Processing voice data might also include recognizing one or more individuals by their speech. By performing spectral analysis on received speech and comparing the spectrally analyzed speech to reference speech patterns stored for one or more individuals or types of individuals, for example, the electronic computing device 200 can determine if a particular individual or type of individual is in proximity to the electronic computing device 200. In one instance, the electronic computing device 200 determines that received speech belongs to its owner. In another instance, the electronic computing device 200 determines that received speech belongs to a boy, and that the received speech could not have originated from a man who is the owner of the electronic computing device 200.

The infrared sensor 212 detects the presence, and in some instances also motion, of one or more individuals in proximity to the electronic computing device 200 using infrared radiation. In different embodiments, the infrared sensor 212 can be passive or active. For embodiments in which multiple infrared sensors are used, the multiple sensors can be all passive, all active, or include a combination of passive and active sensors.

In a particular embodiment, the infrared sensor 212 is an active sensor that represents the sensor 112. The sensor 112 emits near-infrared radiation of a relatively short wavelength of approximately 850 nanometers near the visible spectrum. In the presence of an individual, the emitted radiation is reflected by the individual and detected by the sensor 112. The strength of the detected radiation provides an indication of a distance between the individual and the sensor 112.

The thermal sensor 218 detects the presence, and in some instances also motion, of one or more individuals in proximity to the electronic computing device 200 using heat. Individuals are sources of heat, so the presence of an individual near the thermal sensor 218 increases an ambient temperature at the thermal sensor 218, which the thermal sensor 218 detects.

In a particular embodiment, the thermal sensor 218 represents the thermal sensors 118, 120, 122, and 124, which are located at the corners of the smartphone 100. Each thermal sensor has a plurality of thermocouples between dissimilar metals wired in series so their voltages add. To omit negative voltage contributions from the sum, every other thermocouple is covered in a thermally opaque material. The remaining thermocouples are not so covered and generate only positive voltage contributions when subjected to heat.

By using thermal gratings at the corners of the smartphone 100, the smartphone 100 can also detect motion. Within the housing of the smartphone 100, above the thermal sensors 118, 120, 122, 124, alternating strips of thermally opaque and thermally transparent materials are used to create the thermal gratings. As a heat source moves relative to a thermal grating, an angle of incidence for the heat source at the thermal grating changes. As the angle of incidence changes, heat from the heat sources is alternatingly screened and passed by the thermal grating, resulting in voltage fluctuations from the thermal sensor underneath that are interpreted as movement.

The power supply 216 represents a power source that supplies electric power to the device components 202, 204, 206, 208, 212, 214, 218, 228, as needed, during the course of their normal operation. The power is supplied to meet the individual voltage and load requirements of the device components 202, 204, 206, 208, 212, 214, 218, 228 that draw electric current. For some embodiments, the power supply 216 is a wired power supply that provides direct current from alternating current using a full- or half-wave rectifier. For other embodiments, the power supply 216 is a battery that powers up and runs a portable electronic device. For a particular embodiment, the battery 216 is a rechargeable power source. A rechargeable power source for an electronic device is configured to be temporarily connected to another power source external to the electronic device to restore a charge of the rechargeable power source when it is depleted or less than fully charged. In another embodiment, the battery is simply replaced when it no longer holds sufficient charge.

Figure 3:
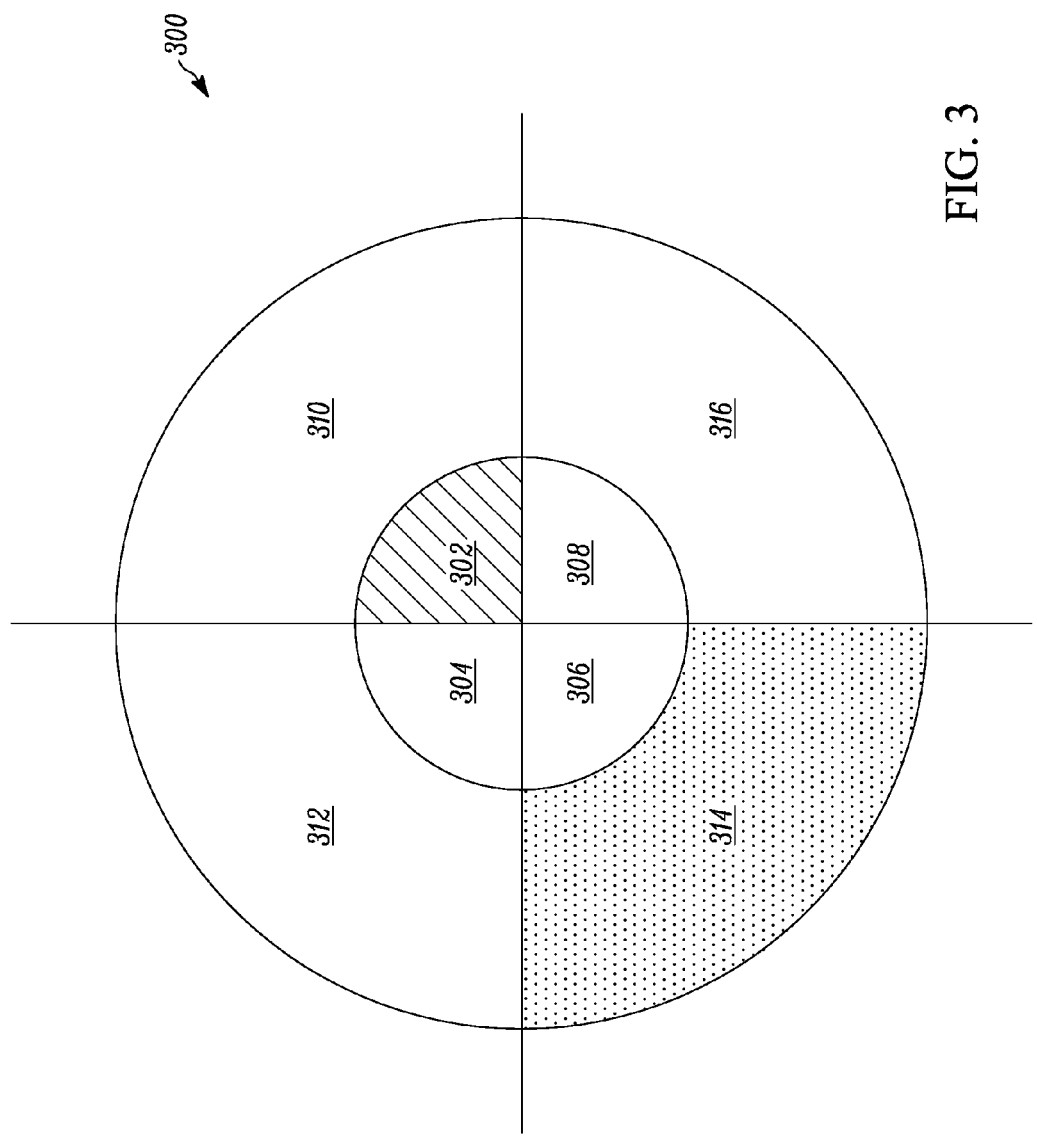
FIG. 3 shows a schematic diagram of proximity detection for an electronic computing device, in accordance with some embodiments.

FIG. 3 shows a schematic diagram 300 illustrating proximity detection for the smartphone 100 using the four thermal sensors 118, 120, 122, and 124. The schematic diagram 300 has an inner circular region with four areas 302, 304, 306, 308 indicated and also an outer annular region with four areas 310, 312, 314, 316 indicated. Areas 302 and 310 form a first quadrant and represent detection by the thermal sensor 120. Areas 304 and 312 form a second quadrant and represent detection by the thermal sensor 118. A third quadrant formed by areas 306 and 314 represents detection by the thermal sensor 122, and a fourth quadrant formed by areas 308 and 316 represents detection by the thermal sensor 124.

For each of the four respective thermal sensors 118, 120, 122, 124, the inner area indicates a detected presence and the outer area indicates detected motion. For a particular embodiment, an individual's presence might be detected within a threshold distance of approximately two feet, while the thermal sensors 118, 120, 122, 124 can detect an individual's motion up to eight feet away. In other embodiments, different distances represent the limits at which an electronic computing device can detect presence or motion.

As shown in FIG. 3, the area 302 is shaded, indicating that the thermal sensor 120 is detecting the presence of a first individual. The area 310, however, is not shaded, indicating that the first individual is stationary relative to the smartphone 100. The area 314 is also shaded, indicating the thermal sensor 122 detects the motion of a second individual. The second individual, however, is not close enough to the smartphone 100 to result in the shading of area 306.

Figure 4:
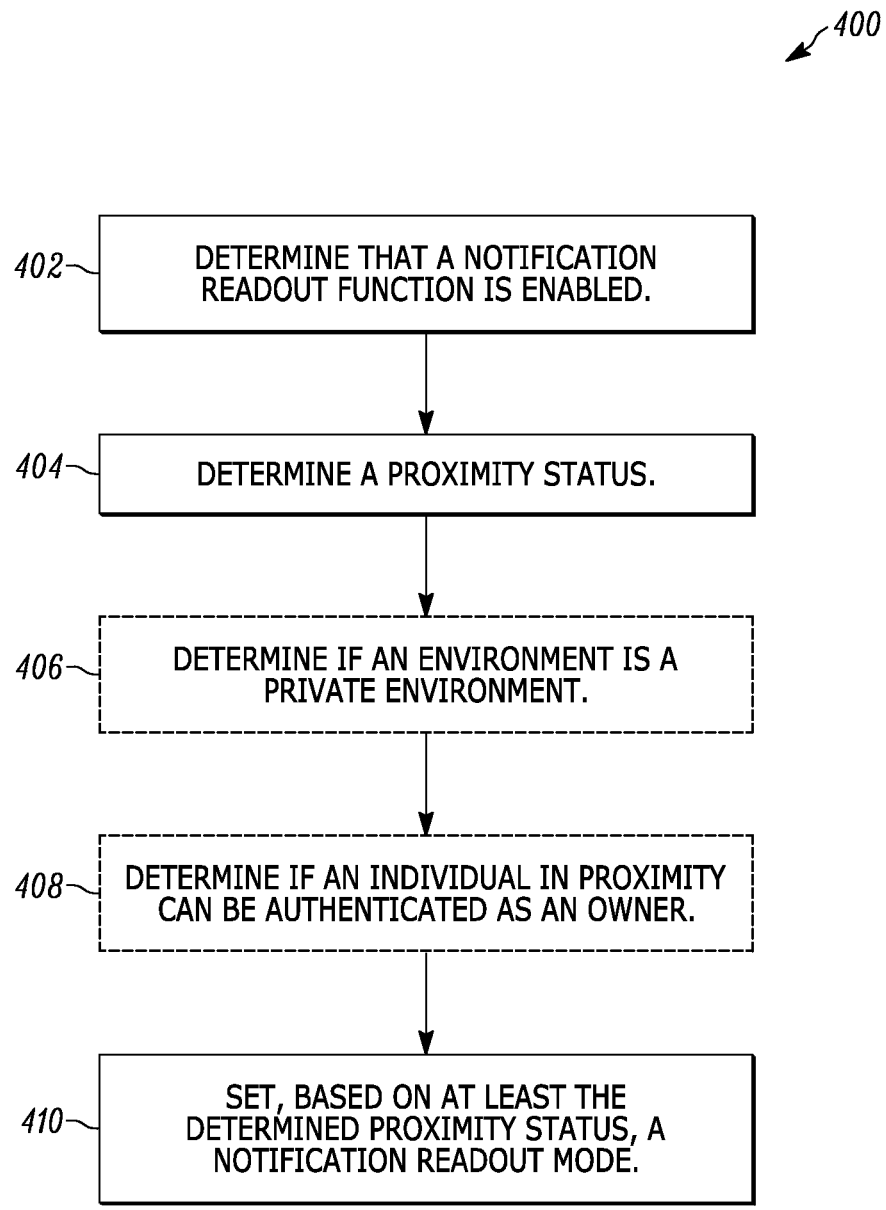
FIG. 4 shows a logical flow diagram illustrating a method for setting a notification readout mode based on proximity detection, in accordance with some embodiments.

With reference to the remaining figures, a detailed description of the functionality of the components shown in FIGS. 1 and 2 is given. FIG. 4 shows a logical flow diagram illustrating a method 400 performed by an electronic computing device, taken to be the smartphone 100 for purposes of this description, for setting a notification readout mode based on proximity detection. Specifically, the smartphone 100 determines 402 that it has a notification readout function enabled.

When a notification readout function is enabled on an electronic computing device, the electronic computing device is in a state for which the electronic computing device reads out notifications for a user or an owner of the electronic computing device to hear. Having notifications read aloud might be the sole or primary purpose for enabling a notification readout function on an electronic computing device. For example, an owner of the smartphone 100 enables a notification readout function on his smartphone 100 so that he doesn't have to interact with the touchscreen 126 to get his messages. As a result, a text-to-speech engine of the smartphone 100 reads out notifications using the speakers 108, 110 or a headphone jack (not shown) of the smartphone 100. In other embodiments, the reading of notifications aloud might be a secondary objective or one of multiple results of enabling a notification readout function. For example, to allow for hands-free operation of the smartphone 100 while driving, the owner sets his smartphone 100 to a drive mode. One feature of the drive mode is that notifications are read aloud.

The smartphone 100 also determines 404 a proximity status for itself. A proximity status for an electronic computing device, as used herein, is a parameter that indicates a number of individuals the electronic computing device uses to make a determination of which notification readout mode to set for itself while a notification readout function is enabled. The proximity status is based on a number of individuals the electronic computing device detects in its immediate vicinity using one or more sensors of the electronic computing device. For a particular embodiment, the smartphone 100 determines its proximity status to indicate no individuals are detected in proximity to the smartphone 100, only one individual is detected in proximity to the smartphone 100, or multiple individuals are detected in proximity to the smartphone 100.

In a first example, the smartphone 100 detects the presence of two individuals using its infrared sensor 112 and its thermal sensors 118, 120, 122, 124. Of the two individuals detected, the smartphone 100 uses a programmed algorithm to determine that one of the two detected individuals is beyond a threshold distance and is moving away. Based on this, the smartphone 100 sets its proximity status to "one," indicating that the smartphone 100 is determining a notification readout mode for itself based on one individual being in proximity to the smartphone 100.

In a second example, the smartphone 100 detects the presence of at least two individuals using its infrared sensor 112, its thermal sensors 118, 120, 122, 124, and is microphone 102. Based on the detection of the at least two individuals, the smartphone 100 sets its proximity status to "multiple," indicating that the smartphone 100 is determining a notification readout mode for itself based on multiple individuals being in proximity to the smartphone 100.

In a third example, the smartphone 100 does not detect the presence of any individuals using any of its sensors. Responsively, the smartphone 100 sets its proximity status to "zero," indicating that the smartphone 100 is determining a notification readout mode for itself based on no individuals being in proximity to the smartphone 100.

For alternative embodiments, as indicated by broken lines, the smartphone 100 determines 406 whether it is in a private environment. A private environment, as used herein, is a setting or a location for an electronic computing device from which an inference of privacy can be made. Privacy, in this case, indicates an expectation that fewer or no individuals in addition to an owner or user of the electronic computing device are present relative to a public or non-private environment. For some embodiments, privacy can also indicate an expectation that individuals present in addition to an owner or user of the electronic computing device are known or familiar to the owner or user.

In one embodiment, the smartphone 100 determines 406 it is in a private environment when it is set to a driving mode. When an owner of the smartphone 100 sets his smartphone 100 to a driving mode, there is an inference that the owner is driving a vehicle and that the vehicle encloses the owner and separates the owner from an outside environment and other individuals. Further, if there is a passenger in the vehicle with the owner, there is an inference that the owner will be familiar with the passenger. If the owner were walking rather than driving, it is less likely that individuals passing by or walking near the owner would be known to the owner as compared to a passenger riding with the owner in his vehicle.

In another embodiment, the smartphone 100 determines 406 it is in a private environment when it is located at a home of the owner of the smartphone 100. The smartphone 100 determines 406, for example, it is located at a residence of its owner using a global positioning receiver (not shown) of the smartphone 100, specifically, when coordinates indicating the smartphone's current position match coordinates the smartphone 100 has stored for the residence. At the owner's residence, there is an inference that the owner will be alone or with friends or family members and an expectation that the residence provides greater privacy as compared to other locations.

In further embodiments, the smartphone 100 determines 406 it is in a private environment when it is located at a place the owner of the smartphone 100 has previously specified as a private environment. In a first example, the owner works in a private office and programs the location of the office into the smartphone 100 as a private environment. When the owner takes his smartphone 100 to his office, the smartphone 100 determines it is in a private environment. In a second example, the owner programs the location of a remote fishing spot he frequents into his smartphone 100 and specifies the location as a private environment.

For other alternative embodiments, the smartphone 100 determines 408 whether an individual in proximity to the smartphone 100 can be authenticated as an owner of the smartphone 100. As used herein, an electronic computing device authenticates an individual as an owner by establishing or confirming the individual's identity as the owner of the electronic computing device.

In one embodiment, the smartphone 100 authenticates an individual as an owner using voice analysis. The smartphone 100 captures a voice sample from an individual into its microphone 102. With a VPM, such as the VPM 214, the smartphone 100 compares, using spectral analysis, for example, the captured voice sample to a stored voice sample for the owner of the smartphone 100. If the comparison indicates a match to within a specified statistical confidence interval, then the smartphone 100 authenticates the individual as the owner.

In some embodiments, the smartphone 100 uses context-dependent speech authentication. The smartphone 100 uses information carried by speech instead of, or in addition to, the speech itself to authenticate an individual. In a first example, the smartphone 100 authenticates an individual when the individual correctly speaks a preprogrammed pin used to unlock the smartphone 100. In a second example, the smartphone 100 authenticates the individual when the correct pin numbers are spoken with the correct voice. In a third example, the individual speaks a key word that identifies the individual to the smartphone 100 as the owner.

In other embodiments, the smartphone 100 uses device-based authentication in place of, or in addition to, speech-based authentication. In a first example, the smartphone 100 authenticates an individual as an owner using a radio-frequency identification (RFID) tag. The individual wears, or has located on his person, an RFID tag that contains electronically stored information which identifies the individual to the smartphone 100 as the owner. The smartphone 100 includes the components needed to read the RFID tag. The RFID tag itself may be powered by a battery, by electromagnetic induction from magnetic fields produced by the smartphone 100, or by interrogating radio waves emitted by the smartphone 100 when the RFID tag is configured to act as a passive transponder.

In a second example, the smartphone 100 authenticates an individual as an owner using a near-field-communication (NFC) tag. The individual wears, or has located on his person, an NFC tag that contains electronically stored information which identifies the individual to the smartphone 100 as the owner. The smartphone 100 is NFC-enabled and powers the passive NFC tag using induction at short distances of approximately a decimeter or less. For an embodiment, the NFC tag and NFC-enabled smartphone 100 operate in accordance with the joint International Organization for Standardization (ISO) and the International Electrotechnical Commission (IEC) standard ISO/IEC 14443.

In a third example, the smartphone 100 authenticates an individual as an owner using a paired device. The individual wears, or has located on his person, a device that is paired with the smartphone 100 and that contains electronically stored information which identifies the individual to the smartphone 100 as the owner. A paired device, as used herein, is a device that shares a link key with an electronic computing device so that the electronic computing device can cryptographically authenticate the paired device. The smartphone 100 can use a paired Bluetooth device worn by an individual as an earpiece or a wristband, for instance, to authenticate the wearer as the owner.

In a fourth example, the smartphone 100 authenticates an individual as an owner using at least one camera (not shown) of the smartphone 100 when the smartphone 100 is configured for facial recognition based on captured images. Using the at least one camera, the smartphone 100 captures an image of an individual who is in proximity to the smartphone 100, wherein the captured image includes at least a portion of the individual's face. The smartphone 100 then compares the captured image to stored reference data for the owner's face to determine if the individual can be authenticated as the owner of the smartphone 100.

Based at least on the determined proximity status, and in some instances also on environment and/or authentication, the smartphone 100 sets 410 a notification readout mode for itself. The notification readout mode controls how the smartphone 100 reads out pending notifications while the notification readout function is enabled. For one embodiment, the smartphone 100 sets 410 the notification readout mode to DIRECT, VERIFY, or QUEUE.

When the notification readout mode is set to DIRECT, the smartphone 100 presently reads out pending notifications as they are received. Reading out pending notifications presently means that pending notifications are read out without any appreciable delay beyond a time period associated with notification processing. For an embodiment, a time period associated with notification processing is typically a few seconds and most always less than a minute. For example, the smartphone 100 receives an e-mail message while its notification readout mode is set to DIRECT. The smartphone 100 processes the e-mail message by determining the message is intended for an owner of the smartphone 100 and makes ready a text-to-speech engine to read out the e-mail. Approximately three seconds after receiving the e-mail message, the smartphone 100 reads the message aloud.

Figure 5:
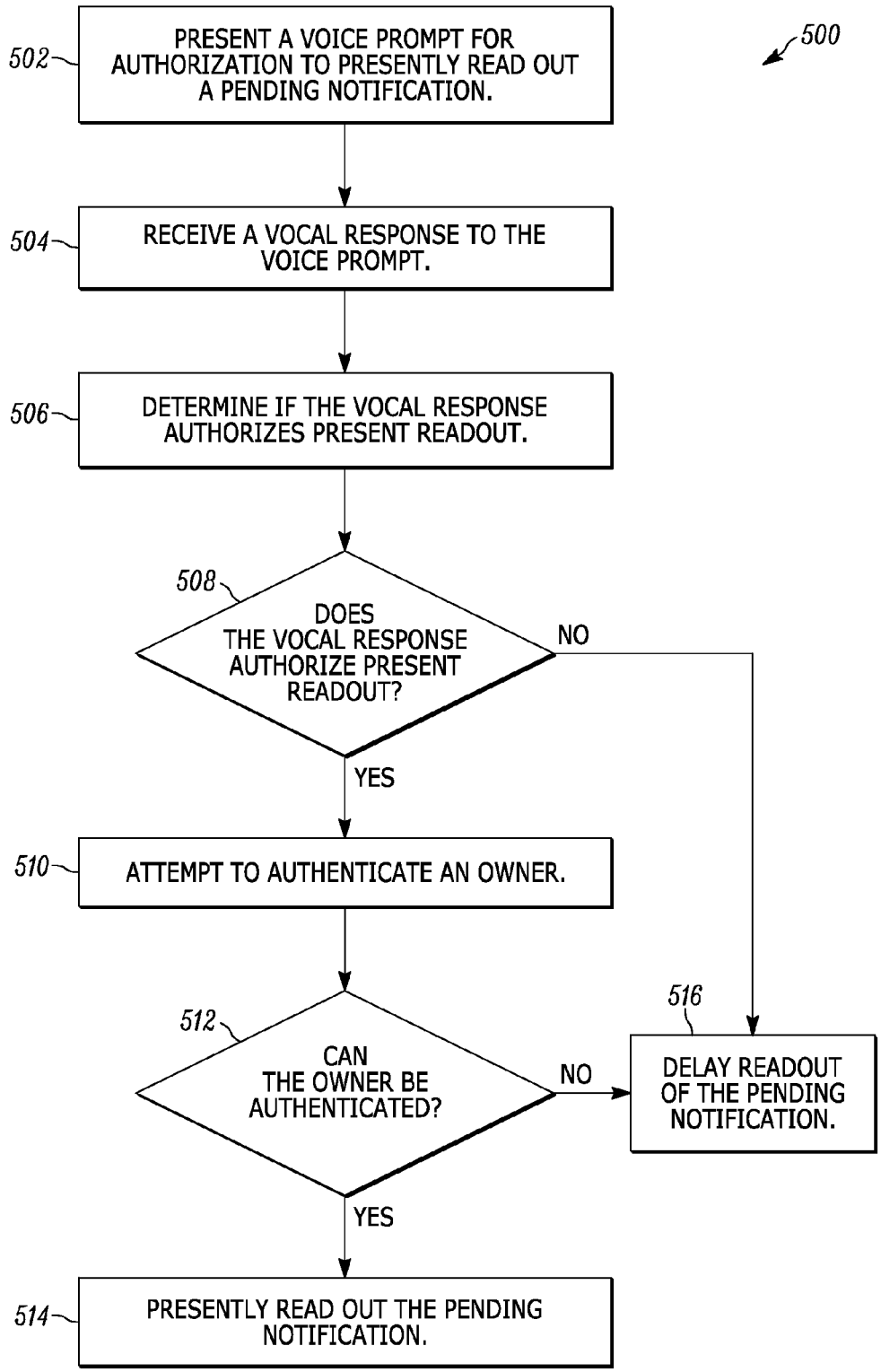
FIG. 5 shows a logical flow diagram illustrating a method for managing a pending notification while a notification readout mode is set to VERIFY, in accordance with some embodiments.

When the notification readout mode is set to VERIFY, the smartphone 100 first seeks authorization to read out pending notifications. FIG. 5 shows a logical flow diagram illustrating a method 500 for managing a pending notification while a notification readout mode is set to VERIFY. The smartphone 100 presents 502 a voice prompt for authorization to presently read out the pending notification available on the smartphone 100. Using the speakers 108, 110, for example, the smartphone 100 prompts: "You have a new message, would you like me to read it?" This prompt, or other possible variations on the voice prompt, allows the owner of the smartphone 100 to either authorize or withhold authorization to presently read out the pending notification.

The smartphone 100 receives 504 the owner's vocal response as he answers the voice prompt and determines 506 if the vocal response authorizes present readout of the pending notification. In some embodiments, the smartphone 100 uses voice-recognition functionality included within a VPM similar to the VPM 214 to process vocal responses it receives. For one embodiment, the smartphone 100 is programmed to recognize one or more specific vocal responses as authorization. When the owner answers "yes," for example, then the smartphone 100 determines 508 that authorization has been received. The smartphone 100 interprets any other response, or no response at all, as withholding authorization.

When the smartphone 100 determines 508 that the vocal response does not authorize present readout, then the smartphone 100 delays 516 the readout of the pending notification until a future time. Vocal responses that do not provide authorization might include: "no," "not now," or "later." For one embodiment, when authorization is not received, the smartphone 100 waits until the notification readout mode is set to DIRECT before the smartphone 100 reads out the pending notification. For another embodiment, the smartphone 100 again presents a voice prompt seeking authorization to read out the pending notification at a later time. For example, after waiting 30 minutes, and while the notification readout mode is still set to VERIFY, the smartphone 100 again prompts: "You have a new message, would you like me to read it?"

For one embodiment, the smartphone 100 presently reads 514 out the pending notification upon determining 508 the vocal response authorizes present readout. For an embodiment represented by the method 500, the smartphone 100 only accepts an affirmative vocal response as authorization if the smartphone 100 determines the vocal response was spoken by the owner or if the owner is authenticated in some other way. After determining 508 the vocal response authorizes present readout, the smartpone 100 attempts 510 to authenticate the owner. Attempts at authentication can be made using any one of, or any combination of, voice analysis, an RFID tag, an NFC tag, a paired device, or facial recognition. For other embodiments, different methods of authentication are utilized. When the smartphone 100 can authenticate 512 the owner, the smartphone 100 presently reads out 514 the pending notification. When the smartphone 100 cannot authenticate 512 the owner, the smartphone 100 delays 516 reading out the pending notification.

When the notification readout mode is set to QUEUE, the smartphone 100 delays reading out pending notifications until the notification readout mode transitions to DIRECT or VERIFY. Effectively, pending notifications are placed in a queue for later readout. For one embodiment, later readout occurs when the smartphone 100 sets the notification readout mode to DIRECT. For another embodiment, later readout occurs when the smartphone 100 sets the notification readout mode to VERIFY and receives authorization in response to a voice prompt. Conditions under which the smartphone 100 sets or changes a setting for the notification readout mode are described in detail with respect to the remaining figures.

Figure 6:
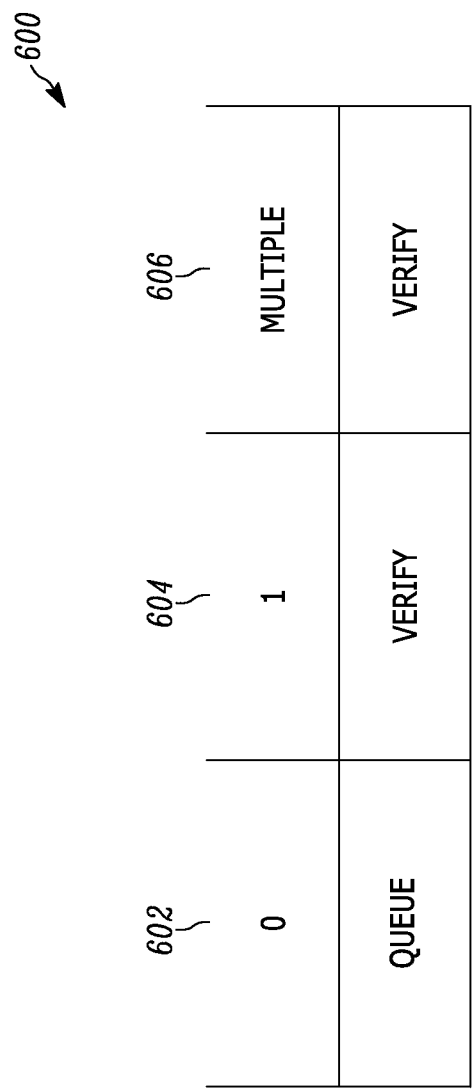
FIG. 6 shows a table indicating a dependence of a notification readout mode upon a proximity status, in accordance with some embodiments.

FIG. 6 shows a table 600 indicating a dependence of the notification readout mode upon the proximity status of the smartphone 100. The table 600 includes three columns 602, 604, and 606, with each column indicating a different proximity status above a specified notification readout mode. When no individuals are detected in proximity to the smartphone 100, the smartphone 100 sets the notification readout mode to QUEUE, as shown in column 602. The smartphone 100 does not presently read out a pending notification when the owner is not detected in proximity to the smartphone 100 and presumably cannot hear the notification being read.

When one individual is detected in proximity to the smartphone 100, the smartphone 100 sets the notification readout mode to VERIFY. This is because the detected individual may or may not be the owner of the smartphone 100. If the owner left his smartphone 100 on his kitchen table or office desk, for example, and then briefly walked away, the smartphone 100 might be detecting the presence of another individual. For some embodiments, a method of verification, such as the method 500, includes attempting 510 authentication in addition to prompting 502 for authorization.

The smartphone 100 also sets the notification readout mode to VERIFY when multiple individuals are detected in proximity to the smartphone 100. This is because the detected individuals may or may not include the owner of the smartphone 100. Further, if the owner is in proximity to the smartphone 100, the owner may not want a pending notification read aloud while others are present for privacy concerns.

Figure 7:
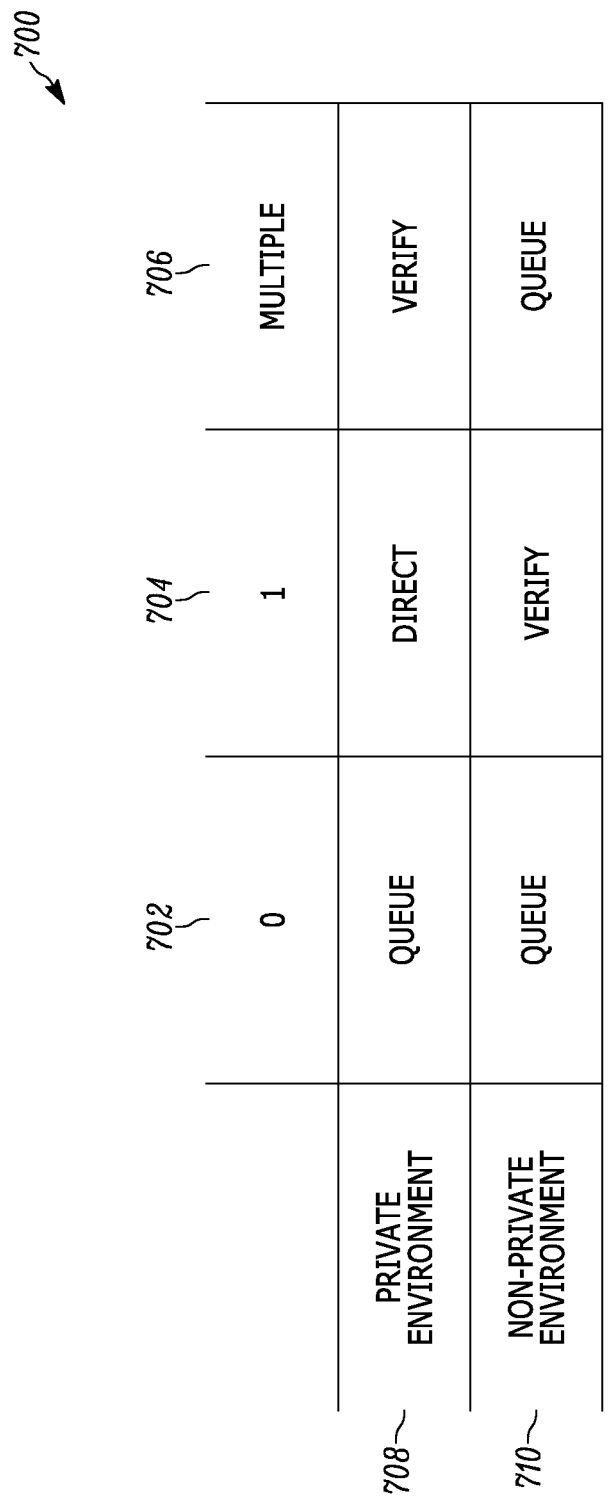
FIG. 7 shows a table indicating a dependence of a notification readout mode upon both a proximity status and a privacy determination, in accordance with some embodiments.

FIG. 7 shows a table 700 indicating a dependence of the notification readout mode upon both the proximity status and a privacy determination for the smartphone 100. The table 700 includes three columns 702, 704, 706, with the first 702, second 704, and third 706 column indicating a proximity status of no individuals, one individual, and multiple individuals, respectively. The table 700 also includes two rows 708, 710, with the first row 708 indicating a private environment and the second row 710 indicating a non-private environment.

When the smartphone 100 fails to detect any individuals in its proximity, the smartphone 100 sets the notification readout mode to QUEUE, irrespective of whether or not the smartphone 100 determines it is in a private environment. If the owner is not in earshot of the smartphone 100, the smartphone 100 delays reading out any pending notifications.

When the smartphone 100 determines a proximity status of only one individual, the smartphone 100 sets the notification readout mode to DIRECT when it determines it is in a private environment and to VERIFY when it determines it is in a non-private environment. A determination of a non-private environment can be a positive determination or a negative determination.

As a positive determination, the smartphone 100 actually determines it is in a non-private environment. For example, the smartphone 100 determines it is in a stadium at a sporting event using a camera and/or a GPS receiver of the smartphone 100. For one embodiment, when the smartphone 100 cannot positively determine it is in either a private environment or a non-private environment, then the table 600 describes the dependence of the notification readout mode on the proximity status.

As a negative determination, the smartphone 100 determines it is in a non-private environment by reason of or as a consequence of failing to determine it is in a private environment. When the smartphone 100 cannot confirm it is in a private environment, a non-private environment becomes the default status.

With only one individual detected in proximity to the smartpone 100 while the smartphone 100 is in a private environment, the assumption is that the detected individual is the owner and that it is safe to presently read out pending notifications. In a non-private environment, however, random individuals are expected and the assumption that the detected individual is the owner is abandoned. In this case, the smartphone 100 seeks authorization before reading any pending notifications aloud.

When the smartphone 100 determines a proximity status of multiple individuals, the smartphone 100 sets the notification readout mode to VERIFY when it determines it is in a private environment and to QUEUE when it determines it is in a non-private environment. With multiple individuals detected in proximity to the smartphone 100 while the smartphone 100 is in a private environment, the assumption is that individuals detected in addition to the owner are individuals known to the owner. They might be family members or friends in the owner's home or car, for example. Because the owner may or may not want even family members or friends overhearing a potentially private notification, the smartphone 100 seeks authorization before reading out any pending notifications.

When multiple individuals are detected in proximity to the smartphone 100 while the smartphone 100 is in a non-private environment, there is a lower likelihood that the owner, if he is present, would want potentially private notifications read out loud in proximity to individuals who could include strangers and individuals less familiar to the owner than his family members or friends. Based on this, the smartphone 100 delays reading out of any pending notifications until the notification readout mode transitions to VERIFY or DIRECT.

Figure 8:
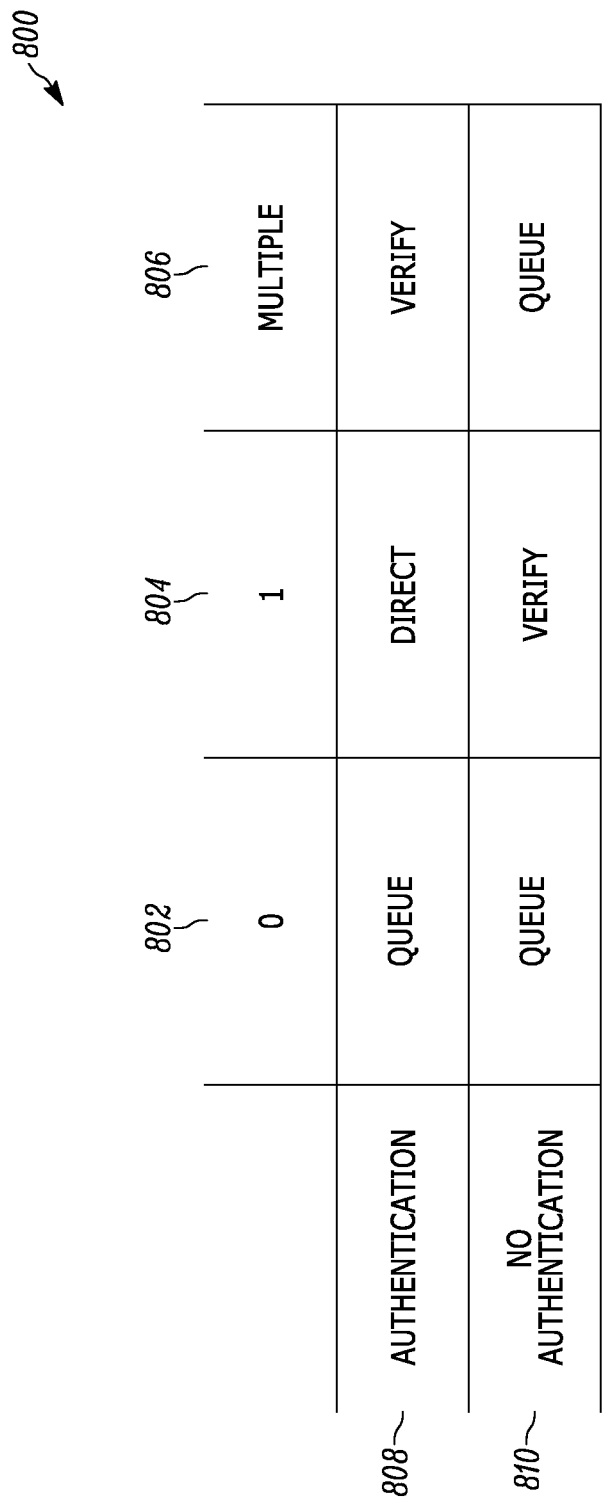
FIG. 8 shows a table indicating a dependence of a notification readout mode upon both a proximity status and an authentication determination, in accordance with some embodiments.

FIG. 8 shows a table 800 indicating a dependence of the notification readout mode for the smartphone 100 upon both the proximity status and an authentication determination. The table 800 includes three columns 802, 804, 806, with the first 802, second 804, and third 806 column indicating a proximity status of no individuals, one individual, and multiple individuals, respectively. The table 800 also includes two rows 808, 810, with the first row 808 indicating authentication of an individual in proximity to the smartphone 100 as the owner of the smartphone 100 and the second row 810 indicating that no such authentication could be made.

When the smartphone 100 fails to detect any individuals in its proximity, the smartphone 100 sets the notification readout mode to QUEUE, irrespective of whether or not the smartphone 100 authenticates an owner. There is an expectation that when no individuals are detected in proximity to the smartphone 100, then the owner is not present to authenticate. If, however, the owner left an RFID tag, and NFC tag, or a paired device behind, the smartphone 100 may generate a false authentication. The smartphone 100 may also authenticate the owner by voice if he is speaking loudly at a distance that puts the owner beyond the detection limits of the infrared 112 or thermal 118, 120, 122, 124 detectors. In either case, the smartphone 100 delays reading out pending notifications until the notification readout mode transitions to VERIFY or QUEUE.

When the smartphone 100 determines a proximity status of only one individual, the smartphone 100 sets the notification readout mode to DIRECT when it determines that an individual in its proximity was authenticated as the owner of the smartphone 100 and to VERIFY when it determines that no individual in its proximity was authenticated as the owner of the smartphone 100. There is minimal risk that a notification read aloud will be overheard by another individual when the only individual detected in proximity to the smartphone 100 is authenticated as the owner of the smartphone 100. If, however, the individual detected was not authenticated as the owner, then the smartphone 100 presents a voice prompt for authorization to presently read out a pending notification. If the smartphone 100 receives an affirmative vocal response, the smartphone 100 attempts to authenticate the responding individual using voice analysis.

When the smartphone 100 determines a proximity status of multiple individuals, the smartphone 100 sets the notification readout mode to VERIFY when it determines that an individual in its proximity was authenticated as the owner of the smartphone 100 and to QUEUE when it determines that no individual in its proximity was authenticated as the owner of the smartphone 100. When individuals in addition to the owner are in proximity to the smartphone 100, the assumption is that the owner would not want the smartphone 100 to read out potentially private notifications without first obtaining authorization. If, however, none of the multiple individuals in proximity to the smartphone 100 can be verified as the owner, then the assumption is the owner is not present and the smartphone 100 delays reading out pending notifications until the notification readout mode transitions to VERIFY or QUEUE.

In additional embodiments for which the smartphone 100 sets its notification readout mode based on proximity detection, different dependencies of the notification readout mode upon proximity status, privacy determination, and/or authentication determination are realized from those indicated in tables 600, 700, and 800. When the smartphone 100 determines a proximity status of multiple individuals while in a verbose mode, for example, the smartphone 100 sets the notification readout mode to DIRECT while in a private environment and to VERIFY while in a non-private environment. When the verbose mode is turned on, the smartphone 100 favors vocalization as compared to when the verbose mode is turned off.

Figure 9:
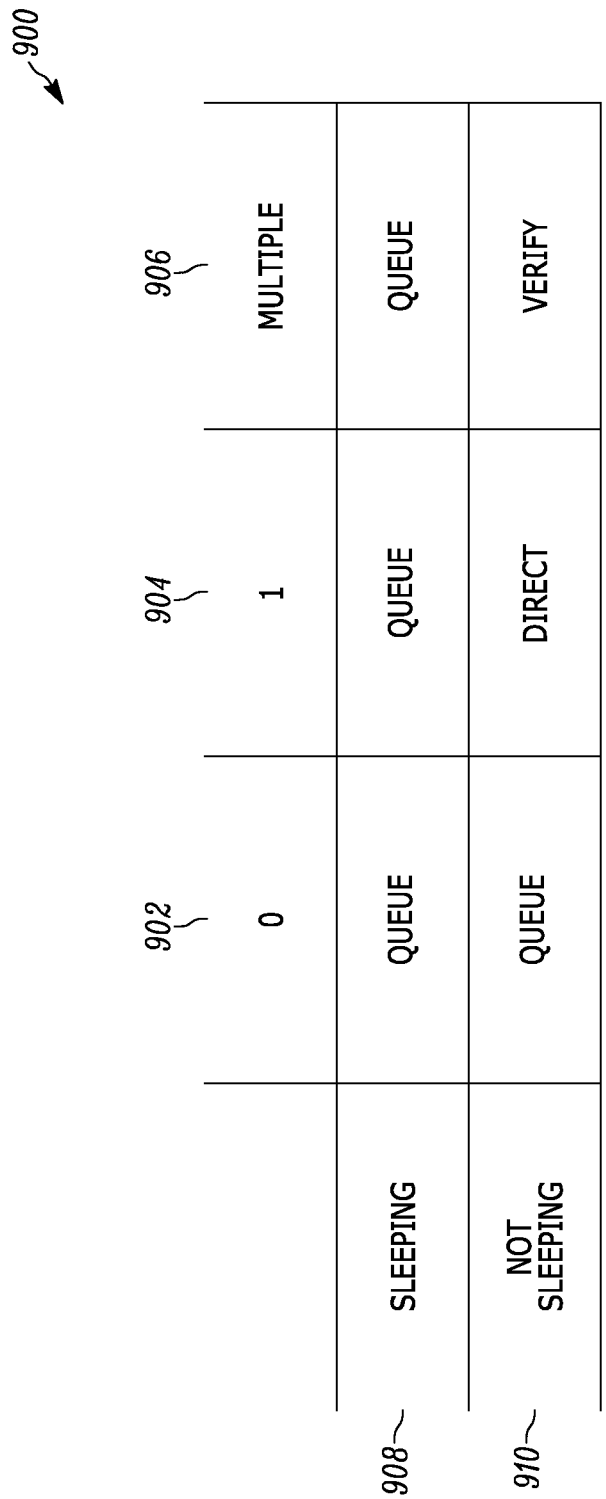
FIG. 9 shows a table indicating a dependence of a notification readout mode upon both a proximity status and a sleep determination, in accordance with some embodiments.

FIG. 9 shows a table 900 indicating a dependence of the notification readout mode for the smartphone 100 upon both the proximity status and a sleep determination. The table 900 includes three columns 902, 904, 906, with the first 902, second 904, and third 906 column indicating a proximity status of no individuals, one individual, and multiple individuals, respectively. The table 900 also includes two rows 908, 910, with the first row 908 indicating that the owner of the smartphone 100 is sleeping and the second row 910 indicating that the owner of the smartphone 100 is not sleeping.

Using at least one biometric monitoring device, the smartphone 100 determines whether or not the owner of the smartphone 100 is sleeping. A biometric monitoring device, as used herein, is a device that is communicatively coupled to an electronic computing device and that monitors a physiological and/or a behavioral status of an owner of the electronic computing device. As the owner is being monitored, the biometric monitoring device communicates the physiological and/or the behavioral status of the owner to the electronic computing device.

In first embodiment, a biometric monitoring device used by the smartphone 100 monitors a pulse rate of the owner. For example, the biometric monitoring device is worn as a bracelet and takes a pulse from the owner's wrist. The wristband is paired with the smartphone 100 as a Bluetooth device and transmits the owner's pulse rate to the smartphone 100.

In a second embodiment, a biometric monitoring device used by the smartphone 100 monitors a level of physical activity the owner engages in. The same, or another, wristband, for example, includes independent-axis accelerometers that can function as a pedometer and/or determine how vigorously the owner is moving his arm.

In a third embodiment, a biometric monitoring device used by the smartphone 100 monitors pulmonary statistics of the owner. For example, a band worn around the owner's upper torso, which may or may not include multiple individual sensors, monitors a rate at which the owner is breathing. As the owner breaths in and out, the band expands and contracts, or is subjected to increasing and decreasing tensions. By detecting the rate at which these changes occur, the band determines the rate at which the owner is breathing. This information is then wirelessly communicated to the smartphone 100. By detecting a maximum expansion or maximum tension, the band can also determine how deeply the owner is breathing in terms of a volume of air inhaled with each breath. When the owner is breathing deeply, as would occur during vigorous exercise, there is greater movement of the owner's diaphragm, accompanied by increased chest expansion.

The smartphone 100 determines the owner is sleeping from any single statistic or combination of statistics monitored by the one or more biometric monitoring devices and communicated to the smartphone 100. A biometric monitoring device, for example, determines or is programmed with the owner's resting pulse rate of 72 beats per minute (bpm). The biometric monitoring device determines the owner is sleeping when the owner's pulse rate drops below 98 percent of his resting pulse rate, being equal to or less than 70 bpm.

In another embodiment, the smartphone 100 determines the owner is sleeping when the owner's breathing is shallow and occurs at or below a rate the smartphone 100 has previously determined to be the owner's sleeping respiratory rate. In a further embodiment, the smartphone 100 determines the owner is sleeping when slow and shallow respiration is accompanied by inactivity.

When the smartphone 100 fails to detect any individuals in its proximity, the smartphone 100 sets the notification readout mode to QUEUE, irrespective of whether or not the owner of the smartphone 100 is sleeping. If the owner is not in proximity to the smartphone 100, then he might be too distant to hear notifications being read aloud. The smartphone 100 delays reading out pending notifications until one of its thermal sensors 118, 120, 122, 124 or its infrared sensor 112 detect at least one individual and the notification readout mode transitions to VERIFY or QUEUE.

When the smartphone 100 determines a proximity status of only one individual, the smartphone 100 sets the notification readout mode to QUEUE when it determines that the owner of the smartphone 100 is sleeping and to VERIFY when it determines that the owner of the smartphone 100 is not sleeping. When the owner is sleeping, the smartphone 100 does not wake the owner, but instead waits until the owner wakes. When the smartphone 100 detects the owner is awake and the only individual in proximity to the smartphone 100, then the smartphone 100 reads out pending notifications directly.

When the smartphone 100 determines a proximity status of multiple individuals, the smartphone 100 sets the notification readout mode to QUEUE when it determines that the owner of the smartphone 100 is sleeping and to VERIFY when it determines that the owner of the smartphone 100 is not sleeping. As before, the smartphone 100 does not wake the owner when he is sleeping. When the owner is awake, the smartphone 100 seeks authorization from the owner before reading out pending notifications in the presence of other individuals.

For some embodiments, the smartphone 100 also sets the notification readout mode based on the owner's activity level when he is awake. When the smartphone 100 determines the owner is exercising vigorously, for example, the smartphone 100 delays reading pending notifications until the owner's activity level drops to a lower intensity.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by an electronic computing device for setting a notification readout mode based on proximity detection, the method comprising:
   determining that a notification readout function is enabled on the electronic computing device;
   determining a proximity status for the electronic computing device using at least one sensor of the electronic computing device; and
   setting, based on the determined proximity status, the notification readout mode for the electronic computing device, the notification readout mode pertaining to when notifications are read out by the computing device, the notification readout mode including a DIRECT mode in which pending notifications are immediately read out, a VERIFY mode in which a prompt for authorization is provided before pending notifications are read out, and a QUEUE mode in which the computing device waits to read out the pending notifications.

2. The method of claim 1, wherein when the notification readout mode is set to DIRECT, the electronic computing device presently reads out pending notifications as they are received.

3. The method of claim 1 further comprising, when the notification readout mode is set to VERIFY:
presenting a voice prompt for authorization to presently read out one or more pending notifications available on the electronic computing device;
receiving a vocal response to the voice prompt; and
determining whether the vocal response authorizes present readout; and
presently reading out, when the vocal response authorizes present readout, the one or more pending notifications; or
delaying reading out, when the vocal response does not authorize present readout, the one or more pending notifications until a future time.

4. The method of claim 3 further comprising, when the vocal response authorizes present readout, attempting to authenticate an owner of the electronic computing device based on the vocal response, wherein:
when the electronic computing device can authenticate the owner, the electronic computing device presently reads out the one or more pending notifications; else
when the electronic computing device cannot authenticate the owner, the electronic computing device delays readout of the one or more pending notifications.

5. The method of claim 1, wherein when the notification readout mode is set to QUEUE, the electronic computing device delays reading out pending notifications until the notification readout mode transitions to DIRECT or VERIFY.

6. The method of claim 1, wherein the determined proximity status indicates one of:
no individuals are detected in proximity to the electronic computing device;
only one individual is detected in proximity to the electronic computing device; or
multiple individuals are detected in proximity to the electronic computing device.

7. The method of claim 6, wherein the notification readout mode is set to:
QUEUE if no individuals are detected in proximity to the electronic computing device;
VERIFY if only one individual is detected in proximity to the electronic computing device; or
VERIFY if multiple individuals are detected in proximity to the electronic computing device.

8. The method of claim 6 further comprising determining whether the electronic computing device is in a private environment.

9. The method of claim 8, wherein determining whether the electronic computing device is in a private environment comprises determining whether:
the electronic computing device is set to a driving mode; or
the electronic computing device is located at a home of an owner of the electronic computing device.

10. The method of claim 8, wherein when the electronic computing device determines a proximity status of only one individual detected in proximity to the electronic computing device, the electronic computing device sets the notification readout mode to:
DIRECT when the electronic computing device determines it is in a private environment; or
VERIFY when the electronic computing device determines it is in a non-private environment.

11. The method of claim 8, wherein when the electronic computing device determines a proximity status of multiple individuals detected in proximity to the electronic computing device, the electronic computing device sets the notification readout mode to:
VERIFY when the electronic computing device determines it is in a private environment; or
QUEUE when the electronic computing device determines it is in a non-private environment.

12. The method of claim 6 further comprising determining whether an individual in proximity to the electronic computing device can be authenticated as an owner of the electronic computing device.

13. The method of claim 12 further comprising authenticating the individual using voice analysis.

14. The method of claim 12 further comprising authenticating the individual using at least one of:
a radio-frequency identification tag;
a near-field-communication tag; or
a paired device.

15. The method of claim 12, wherein when the electronic computing device determines a proximity status of only one individual detected in proximity to the electronic computing device, the electronic computing device sets the notification readout mode to:
DIRECT when the electronic computing device determines that an individual in proximity to the electronic computing device can be authenticated as the owner of the electronic computing device; or
VERIFY when the electronic computing device determines that no individual in proximity to the electronic computing device can be authenticated as the owner of the electronic computing device.

16. The method of claim 12, wherein when the electronic computing device determines a proximity status of multiple individuals detected in proximity to the electronic computing device, the electronic computing device sets the notification readout mode to:
VERIFY when the electronic computing device determines that an individual in proximity to the electronic computing device can be authenticated as the owner of the electronic computing device; or
QUEUE when the electronic computing device determines that no individual in proximity to the electronic computing device can be authenticated the owner of the electronic computing device.

17. The method of claim 6 further comprising determining, using at least one biometric monitoring device, whether an owner of the electronic computing device is sleeping, wherein when the electronic computing device determines a proximity status of only one individual detected in proximity to the electronic computing device, the electronic computing device sets the notification readout mode to:
QUEUE when the electronic computing device determines that the owner of the electronic computing device is sleeping; or DIRECT when the electronic computing device determines that the owner of the electronic computing device is not sleeping.

18. The method of claim 6 further comprising determining, using at least one biometric monitoring device, whether an owner of the electronic computing device is sleeping, wherein when the electronic computing device determines a proximity status of multiple individuals detected in proximity to the electronic computing device, the electronic computing device sets the notification readout mode to:
- QUEUE when the electronic computing device determines that the owner of the electronic computing device is sleeping; or
- VERIFY when the electronic computing device determines that the owner of the electronic computing device is not sleeping.

19. An electronic computing device configured to set a notification readout mode based on proximity detection, the electronic computing device comprising:
- at least one sensor configured to detect individuals in proximity to the electronic computing device; and
- a processing element operatively coupled to the at least one sensor, wherein the processing element is configured to:
  - determine a proximity status of no individuals, one individual, or multiple individuals detected in proximity to the electronic computing device; and
  - set, based on the determined proximity status, the notification readout mode for the electronic computing device, the notification readout mode pertaining to when notifications are read out by the computing device, the notification readout mode including a VERIFY mode in which a prompt for authorization is provided before pending notifications are read out.

20. The electronic computing device of claim 19, wherein the at least one sensor comprises at least one of:
- a thermal sensor; or
- an infrared sensor.

21. The electronic computing device of claim 19 further comprising:
- a microphone configured to receive a voice of an individual in proximity to the electronic computing device; and
- a voice processing module operatively coupled to the microphone and the processing element, the voice processing module configured to perform voice analysis upon the voice; and
- wherein the processing element is further configured to:
  - authenticate, based on the voice analysis, that the individual in proximity to the electronic computing device is an owner of the electronic computing device; and
  - set the notification readout mode to DIRECT when the processing element determines a proximity status of one individual; or
  - set the notification readout mode to VERIFY mode when the processing element determines a proximity status of multiple individuals.

* * * * *